United States Patent
Kano et al.

(10) Patent No.: US 12,194,957 B2
(45) Date of Patent: Jan. 14, 2025

(54) INFORMATION PROCESSING DEVICE AND VEHICLE SYSTEM

(71) Applicant: TOYOTA JIDOSHA KABUSHIKI KAISHA, Toyota (JP)

(72) Inventors: Hirokazu Kano, Nagoya (JP); Masatoshi Hayashi, Nisshin (JP); Reita Kamei, Nagoya (JP); Namika Hara, Kameyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/314,612

(22) Filed: May 7, 2021

(65) Prior Publication Data

US 2021/0370871 A1 Dec. 2, 2021

(51) Int. Cl.
*B60R 25/24* (2013.01)
*B60R 25/102* (2013.01)
*G07C 5/00* (2006.01)

(52) U.S. Cl.
CPC ............ *B60R 25/24* (2013.01); *B60R 25/102* (2013.01); *G07C 5/008* (2013.01); *B60R 2325/10* (2013.01)

(58) Field of Classification Search
CPC ... B60R 25/24; B60R 25/102; B60R 2325/10; G07C 5/008; G07C 2009/0088; G07C 9/00896; G07C 9/00857; G07C 9/00571
See application file for complete search history.

(56) References Cited

U.S. PATENT DOCUMENTS

| | | | |
|---|---|---|---|
| 6,696,981 B1 * | 2/2004 | Hashimoto | G08G 1/065 705/13 |
| 10,387,826 B2 * | 8/2019 | Simmons | G06Q 10/087 |
| 10,807,566 B2 | 10/2020 | Imai et al. | |
| 11,004,000 B1 * | 5/2021 | Gutmann | B60W 30/0956 |
| 11,242,034 B2 * | 2/2022 | Noguchi | B60R 25/2018 |
| 11,919,476 B1 * | 3/2024 | Hamdan | B60R 25/102 |
| 2004/0193347 A1 * | 9/2004 | Harumoto | G08G 1/166 701/45 |
| 2011/0153166 A1 * | 6/2011 | Yester | B60W 30/09 701/45 |
| 2014/0232518 A1 * | 8/2014 | Stoehr | G07B 15/04 340/5.6 |
| 2017/0109942 A1 * | 4/2017 | Zivkovic | G06Q 20/3278 |
| 2017/0116804 A1 * | 4/2017 | Bae | G07C 9/25 |
| 2018/0265040 A1 * | 9/2018 | Nowottnick | B60R 25/24 |
| 2018/0326947 A1 * | 11/2018 | Oesterling | B60R 25/241 |
| 2019/0188817 A1 | 6/2019 | Yanagida et al. | |
| 2019/0197808 A1 * | 6/2019 | Jinnai | B60R 25/24 |

(Continued)

FOREIGN PATENT DOCUMENTS

| | | | | |
|---|---|---|---|---|
| CN | 106302713 A | | 1/2017 | |
| CN | 106816035 A * | 6/2017 | | G08B 27/006 |

(Continued)

*Primary Examiner* — Redhwan K Mawari
(74) *Attorney, Agent, or Firm* — Sughrue Mion, PLLC (57) ABSTRACT

An information processing device comprises a controller configured to detect, in relation to an area associated with a predetermined facility, entry or exit of a predetermined vehicle, transmit, to a facility device corresponding to the facility, in a case where the vehicle enters the area, an electronic key for enabling movement of the vehicle, and invalidate the electronic key transmitted to the facility device in a case where the vehicle exits the area.

20 Claims, 9 Drawing Sheets

(56) References Cited

U.S. PATENT DOCUMENTS

| | | | |
|---|---|---|---|
| 2019/0232958 A1* | 8/2019 | Deng | B60T 7/22 |
| 2019/0266820 A1 | 8/2019 | Suzuki et al. | |
| 2019/0361440 A1* | 11/2019 | Wu | G05D 1/0289 |
| 2020/0143682 A1* | 5/2020 | Chow | G01C 21/3685 |
| 2020/0198620 A1* | 6/2020 | Nakata | B60W 60/0053 |
| 2020/0361414 A1* | 11/2020 | Noguchi | B60R 25/248 |
| 2021/0370871 A1* | 12/2021 | Kano | G07C 9/00857 |
| 2021/0370875 A1* | 12/2021 | Kano | B60R 25/245 |
| 2022/0126786 A1* | 4/2022 | Hassani | H04L 63/068 |

FOREIGN PATENT DOCUMENTS

| | | | |
|---|---|---|---|
| CN | 110048996 A | | 7/2019 |
| CN | 110111546 A | * | 8/2019 |
| JP | 2003263700 A | * | 9/2003 |
| JP | 2010-922 A | | 1/2010 |
| JP | 2018-160087 A | | 10/2018 |
| JP | 2019-148059 A | | 9/2019 |
| JP | 2020-4317 A | | 1/2020 |
| JP | 2020-187624 A | | 11/2020 |

\* cited by examiner

RESERVATION DATA

| SCHEDULED ENTRY DATE/TIME | VEHICLE ID | FACILITY ID | SCHEDULED EXIT DATE/TIME |
|---|---|---|---|
| ... | V001 | F001 | ... |
| ... | V002 | F002 | ... |
| ... | V003 | F003 | ... |
| ... | V004 | F004 | ... |
| ... | ... | ... | ... |
|  |  |  |  |

FIG. 3

VEHICLE DATA

| DATE/TIME | VEHICLE ID | POSITION INFORMATION | KEY USE STATE |
|---|---|---|---|
| ... | V001 | LOCATION A | IN USE (MOBILE TERMINAL ID: xxx) |
| ... | V002 | LOCATION A | ... |
| ... | V003 | LOCATION B | ... |
| ... | V004 | LOCATION B | ... |
| ... | V005 | LOCATION C | ... |

INFORMATION PROCESSING DEVICE AND VEHICLE SYSTEM

CROSS REFERENCE TO THE RELATED APPLICATION

This application claims the benefit of Japanese Patent Application No. 2020-095603, filed on Jun. 1, 2020, which is hereby incorporated by reference herein in its entirety.

BACKGROUND

Technical Field

The present disclosure relates to a technology for providing services to users.

Description of the Related Art

A system that enables a vehicle to be locked/unlocked with an electronic key is being developed. For example, Patent document 1 discloses a system that enables an owner to lend an electronic key of a vehicle to a third party by a simple operation.

Patent Literature

Patent Document 1: Japanese Patent Laid-Open No. 2019-148059

SUMMARY

In the case of temporarily lending a vehicle that uses an electronic key to a third party, it is conceivable to hand over the electronic key using mobile terminals (such as smartphones) carried by the two parties. However, in the case of valet parking (a mode in which a valet parks or brings a vehicle from a parking lot of a hotel or the like), it is difficult to hand over the electronic key beforehand.

The present disclosure has been made in view of the above problem, and an object thereof is to increase convenience of a system for temporarily lending an electronic key of a vehicle.

The present disclosure in its one aspect provides an information processing device comprising a controller configured to detect, in relation to an area associated with a predetermined facility, entry or exit of a predetermined vehicle, transmit, to a facility device corresponding to the facility, in a case where the vehicle enters the area, an electronic key for enabling movement of the vehicle, and invalidate the electronic key transmitted to the facility device in a case where the vehicle exits the area.

The present disclosure in its another aspect provides a vehicle system including a first server device that manages a plurality of vehicles, and a second server device that is associated with a predetermined facility, wherein the first server device includes a first controller configured to detect, in relation to an area associated with the predetermined facility, entry or exit of a predetermined vehicle, transmit, to the second server device, in a case where the vehicle enters the area, an electronic key for enabling movement of the vehicle, and invalidate the electronic key transmitted to the second server device in a case where the vehicle exits the area.

The present disclosure in its another aspect provides a vehicle system including a server device that manages a plurality of vehicles, and on-board devices that are mounted on the vehicles, wherein the server device includes a first controller configured to detect, in relation to an area associated with a predetermined facility, entry or exit of a predetermined vehicle, transmit, to a facility device associated with the predetermined facility, in a case where the vehicle enters the area, an electronic key for enabling movement of the vehicle, and invalidate the electronic key transmitted to the facility device in a case where the vehicle exits the area, and the on-board device includes a second controller configured to acquire the electronic key transmitted to the facility device, and permit movement of the vehicle based on the electronic key.

Furthermore, as another mode, there may be cited a program for causing a computer to perform the information processing method described above, or a computer-readable storage medium non-transitorily storing the program.

According to the present disclosure, it is possible to increase convenience of a system for temporarily lending an electronic key of a vehicle.

DESCRIPTION OF THE EMBODIMENTS

An information processing device according to a first aspect is a device that manages and distributes an electronic key that enables unlocking of a predetermined vehicle. To unlock a vehicle is to unlock a door and enable starting of an engine (or turning on of power).

Specifically, there is included a controller that is configured to: detect, in relation to an area associated with a predetermined facility, entry or exit of a predetermined vehicle, transmit, to a facility device corresponding to the facility, in a case where the vehicle enters the area, an electronic key for enabling movement of the vehicle, and invalidate the electronic key transmitted to the facility device in a case where the vehicle exits the area.

The vehicle according to the present aspect has a function of authenticating a driver using the electronic key. When authentication succeeds, locking/unlocking of a door and control of ignition are enabled, and driving of the vehicle becomes possible.

The information processing device detects, in relation to the area associated with the predetermined facility, entry or exit of a predetermined vehicle, and transmits a corresponding electronic key to a device (the facility device) corresponding to the facility in a case of entry of the vehicle. Furthermore, when the vehicle exits the area, the transmitted electronic key is invalidated.

According to such a configuration, an electronic key that is valid only on the premises (such as a parking lot) of a hotel, a commercial facility or the like may be transmitted to a device of the facility, and a valet of the parking lot or the like may be temporarily allowed to move the vehicle even when the key is not handed over.

Additionally, the facility device may be a mobile terminal carried by a worker of the facility or a device that manages the mobile terminal.

When the electronic key is transmitted to the mobile terminal, communication with a target vehicle is facilitated. Furthermore, by transmitting the electronic key to the device that manages the mobile terminal, the electronic key may be distributed to a plurality of mobile terminals.

Furthermore, the information processing device may further include a storage configured to store reservation information for the facility in association with the vehicle, where the controller may transmit the electronic key in a case where a reservation is made for the facility in association with the vehicle and the vehicle enters the area.

By transmitting the electronic key only when there is a reservation for the facility, transmission of the electronic key not, intended by a user may be prevented.

Furthermore, the controller may periodically acquire first position information that is position information of the vehicle, and determine entry/exit of the vehicle based on the first position information.

The position information of the vehicle may be acquired from an on-board device mounted on the vehicle, or may be acquired from a mobile terminal carried by a user on board the vehicle, for example.

Furthermore, the information processing device may further include a storage configured to store second position information that is position information of an entrance and an exit of the area, where the controller may determine entry/exit of the vehicle by checking the first position information and the second position information against each other.

According to such a configuration, passing of a vehicle through the entrance or the exit may be determined, and whether a target vehicle is using the facility may be determined with high accuracy.

Furthermore, the controller may monitor the first position information in a period when the electronic key is being used, and issue a notification to a user device associated with the vehicle in a case where exit of the vehicle to outside the area is determined.

A period when the electronic key is being used is a period when the vehicle is unlocked with the electronic key. According to such a configuration, an owner of the vehicle or the like may be notified when the transmitted electronic key is used in an unexpected way.

Furthermore, the controller may acquire sensor information from the vehicle in a period when the electronic key is being used, and issue a notification to a user device associated with the vehicle in a case where the sensor information indicates an abnormal value.

For example, by using a sensor that detects an impact, occurrence of a trouble on a vehicle may be notified to an owner of the vehicle or the like.

Moreover, a vehicle system according to a second aspect is a system including the information processing device (a first server device) and the facility device (a second server device).

The second server device may distribute the electronic key to at least one mobile terminal carried by a worker of the facility.

According to such a configuration, a plurality of workers may be allowed to move a vehicle that is using the facility.

Furthermore, in a case where the vehicle exits the area, the first server device may transmit, to the second server device, invalidation data requesting invalidation of the electronic key.

Furthermore, in a case where the invalidation data is received, the second server device may distribute, to the at least one mobile terminal, an instruction to erase the electronic key.

According to such a configuration, the electronic key may be erased from all the mobile terminals.

Furthermore, the vehicle system according to the second aspect may include the mobile terminal.

The mobile terminal may lock/unlock the vehicle by transmitting the electronic key to the vehicle by near-field wireless communication.

According to such an aspect, contactless communication with the vehicle is enabled.

Moreover, a vehicle system according to a third aspect is a system including the information processing device (a server device), and an on-board device mounted on a vehicle.

In the following, embodiments of the present disclosure will be described with reference to the drawings. Configurations of the following embodiments are merely exemplary, and the present disclosure is not limited to the configurations of the embodiments.

First Embodiment

An outline of a vehicle system according to a first embodiment will be described with reference to FIG. 1. The system according to the present embodiment includes a management server 100, a facility device F, and an on-board device 400 mounted on a vehicle 10.

The management server 100 is a server device that manages electronic keys of a plurality of vehicles 10.

The facility device F is at least one computer in a facility where the vehicle 10 visits (a facility where valet parking is performed; for example, a hotel or a commercial facility). In the preset embodiment, the facility device F includes a facility server 200 and a mobile terminal 300. The mobile terminal 300 is a terminal that is carried by a worker of the facility (a valet who moves vehicles). Moreover, the facility server 200 is a device that manages a plurality of mobile terminals 300.

The on-board device 400 is a computer that is mounted on the vehicle 10, and performs unlocking of the vehicle based on a result of authentication of the mobile terminal 300. To unlock a vehicle is to unlock a door and enable starting of an engine (or turning on of power).

In the present embodiment, the management server 100 monitors position information of the vehicle 10 (the on-board device 400), and when the vehicle 10 arrives at a predetermined facility, the management server 100 transmits the electronic key of the vehicle 10 to the facility server 200 corresponding to the facility. The electronic key that is transmitted is a temporary key that is valid only when the vehicle 10 is on the premises of the facility. The electronic key is distributed to the mobile terminal 300 through the facility server 200.

With this system, a vehicle may be moved in a parking lot without the key being handed over between the driver and the valet.

Components of the system will be described in detail.

The management server 100 may be a general-purpose computer. That is, the management server 100 may be a computer that includes processors such as a CPU and a CPU, main memories such as a RAM and a ROM, and auxiliary memories such as an EPROM, a hard disk drive and a removable medium. Additionally, the removable medium may be an USB memory or a disk recording medium such as a CD or a DVD, for example. The auxiliary memory stores an operating system (OS), various programs, various tables and the like, and may implement a function matching a predetermined object as described below by executing a program that is stored therein. However, one or some or all of functions may alternatively be implemented by a hardware circuit such as an ASIC or an FPGA.

Figure 1:
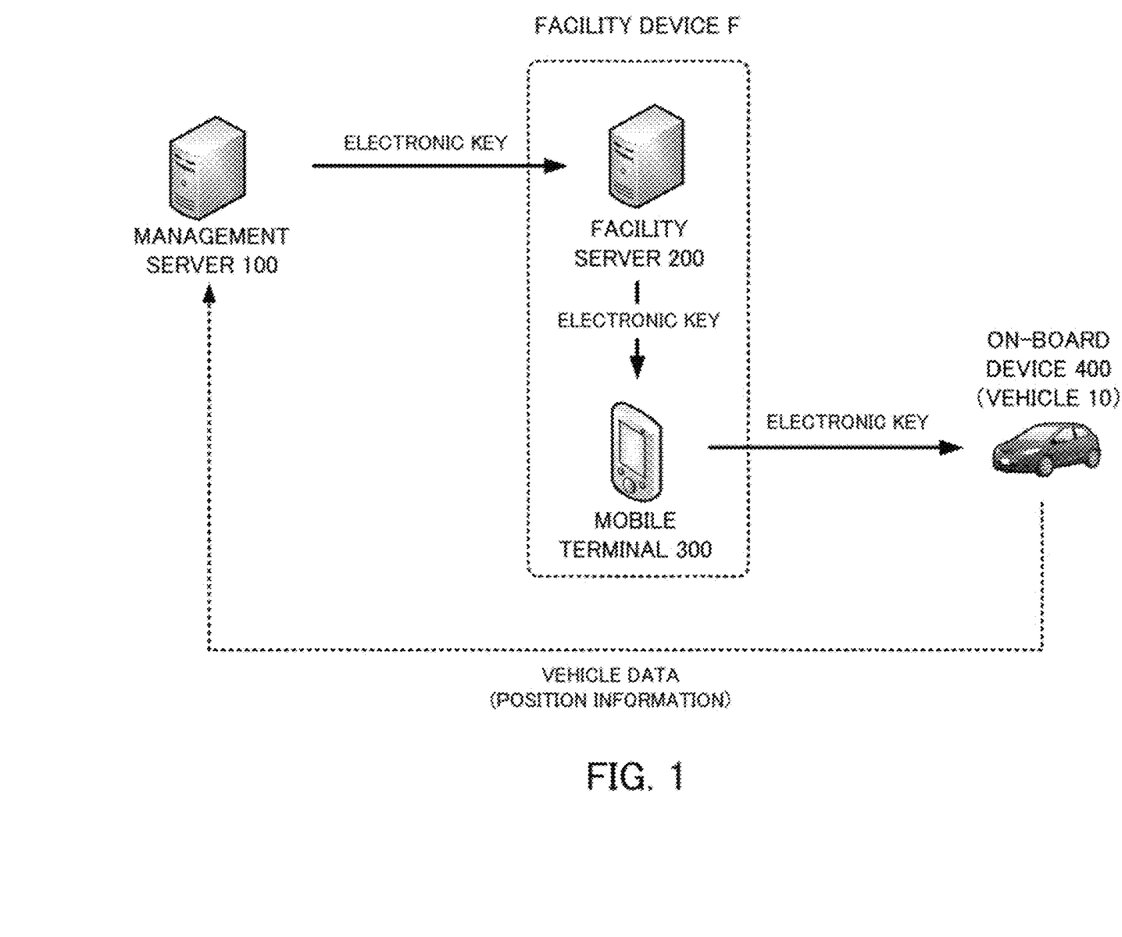
FIG. 1 is a schematic diagram of a vehicle system according to an embodiment.
Figure 2:
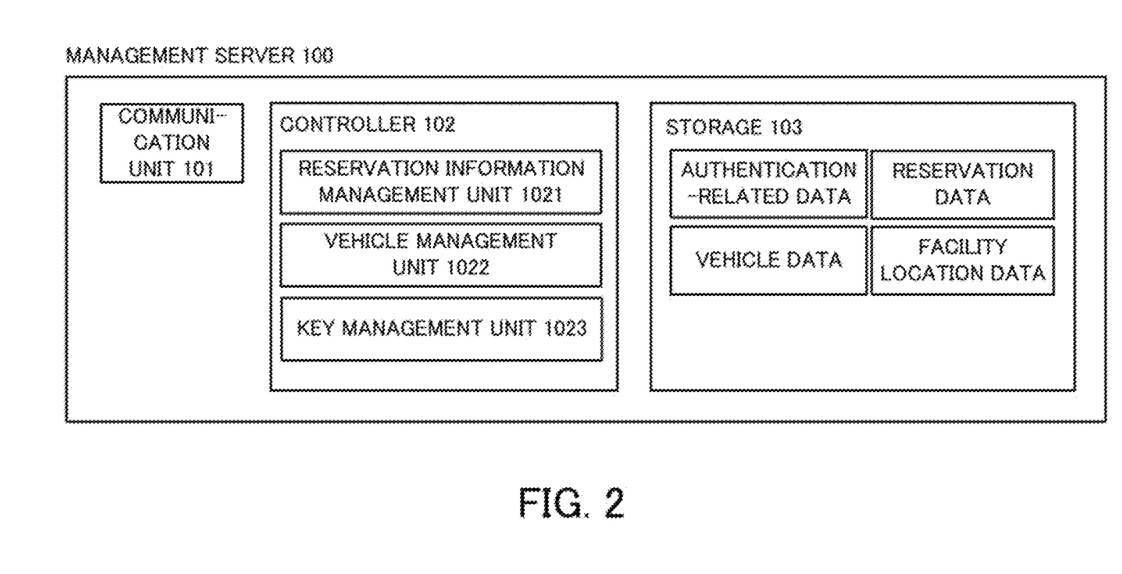
FIG. 2 is a block diagram schematically illustrating an example of a management server.

FIG. 2 is a block diagram schematically illustrating an example configuration of the management server 100 illustrated in FIG. 1. The management server 100 incudes a communication unit 101, a controller 102, and a storage 103.

The communication unit 101 is an interface used to perform communication with the facility server 200 and the on-board device 400 over a network.

The controller 102 is a unit configured to control the management server 100. The controller 102 is a CPU, for example.

As functional modules, the controller 102 includes a reservation information management unit 1021, a vehicle management unit 1022, and a key management unit 1023. Each functional module is implemented by the CPU executing a program stored in storage such as a ROM.

The reservation information management unit 1021 manages reservation information for a facility from a user. In the present specification, a user is the owner of the vehicle 10 who uses a facility.

Figure 3:
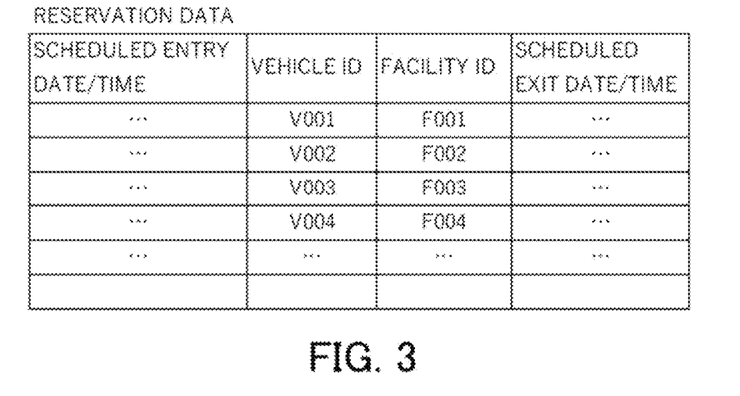
FIG. 3 is a diagram illustrating an example of reservation data.

In the present embodiment, the reservation information management unit 1021 acquires, from the user, data including an identifier of a facility that is a reservation target, an identifier of the vehicle 10 associated with the user, scheduled date/time of visiting the facility by the vehicle 10, and scheduled date/time of exit of the vehicle 10 from the facility. The data acquired by the reservation information management unit 1021 is stored, as reservation data, in the storage 103 described later. FIG. 3 is an example of the reservation data. Additionally, "vehicle ID" in the drawing is the identifier of the vehicle 10. Furthermore, "facility ID" is the identifier of the facility that is used by the user.

The reservation data is also transmitted to the facility server 200 to fix the reservation. The reservation data may include other information pieces to be used by the facility side. FIG. 3 illustrates only items that are used by the management server 100.

The vehicle management unit 1022 manages a plurality of vehicles 10 that are used by users. Specifically, communication is periodically performed with the on-board devices 400 mounted on the vehicles 10, and vehicle data is collected. Typically, the vehicle data is data including position information of the vehicle 10.

Figure 4:
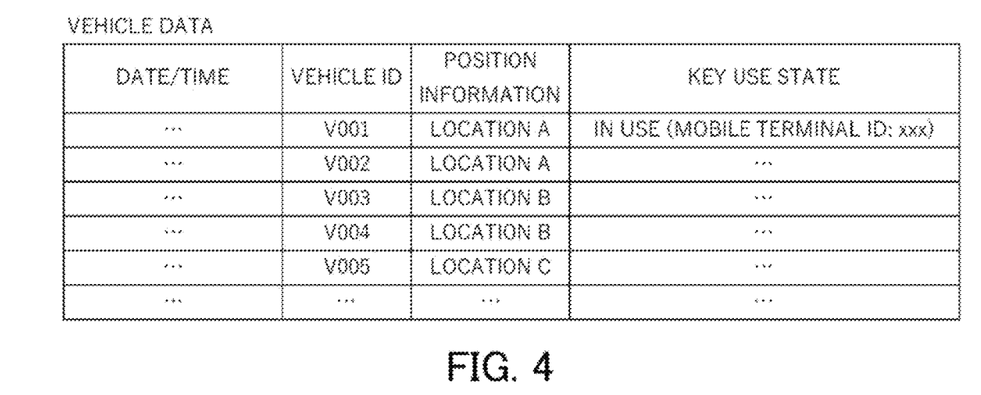
FIG. 4 is a diagram illustrating an example of vehicle data.

The vehicle data acquired by the vehicle management unit 1022 is stored in the storage 103. FIG. 4 is an example of the vehicle data. Additionally, "vehicle ID" in the drawing is the identifier of the vehicle 10, Furthermore, "position information" is data indicating a geographical position of the vehicle 10.

Whether the vehicle 10 is unlocked with the electronic key issued by the management server 100 is indicated in "key use state" This information may be updated based on the vehicle data that is transmitted from the on-board device 400. For example, the on-board device 400 may include, in the vehicle data, "whether the corresponding vehicle 10 is unlocked with the electronic key" and "identifier of the mobile terminal 300 to which the electronic key is transmitted." and transmit the vehicle data to the management server 100, and the management server 100 may reflect the information in the vehicle data.

The key management unit 1023 manages the electronic keys of a plurality of vehicles 10 that are being managed by the system. The electronic key is authentication data for unlocking the vehicle 10.

The key management unit 1023 generates or acquires an electronic key corresponding to a vehicle 10 under a condition that the vehicle 10 arrived at a facility for which a reservation was made by the user, and transmit s the electronic key to a facility device (the facility server 200) corresponding to the facility.

As the electronic key, an electronic key that is stored in advance may be acquired, or an electronic key may be dynamically generated. For example, an electronic key that is valid only in a predetermined time slot, an electronic key for which the number of times of use is specified, or an electronic key that can be used only by a predetermined mobile terminal may be generated.

The storage 103 is a unit configured to store information, and is a storage medium such as a PAM, a magnetic disk or a flash memory. The storage 103 stores various programs to be executed by the controller 102, data to be used by the programs, and the like. Furthermore, the storage 103 stores data (authentication-related data) for generating the electronic key described above, the vehicle data described above, and the reservation data.

The storage 103 further stores facility location data. The facility location data is data indicating a geographical location of an area corresponding to a facility (i.e., premises of a facility). Whether the vehicle is on the premises of a facility may be determined by comparing the position information of the vehicle 10 with the facility location data.

Next, a description will be given of the facility device F. In the present embodiment, the facility device includes the facility server 200 and a plurality of mobile terminals 300. The mobile terminal 300 is a terminal (such as a smartphone) carried by a valet who is to move the vehicle 10, and the facility server 200 is a computer that manages the plurality of mobile terminals 300. The facility server 200 and the mobile terminal 300 exist for each facility (such as a hotel or a commercial facility) to be used by users.

Figure 5:
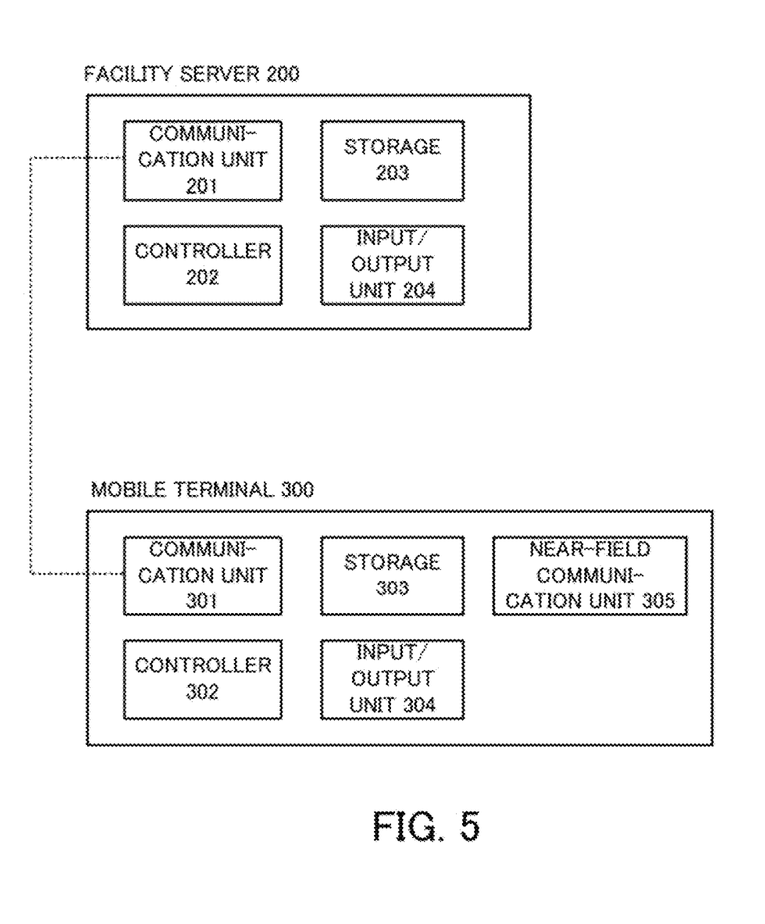
FIG. 5 is a block diagram schematically illustrating examples of a facility server and a mobile terminal.

FIG. 5 is a block diagram schematically illustrating example configurations of the facility server 200 and the mobile terminal 300.

The facility server 200 receives an electronic key corresponding to a vehicle 10 from the management server 100, and distributes the electronic key to at least one mobile terminal 300 under its management. Furthermore, in a case where data requesting invalidation of a received electronic key is received from the management server 100, an instruction to erase the electronic key is issued to the mobile terminal 300 that is being managed. The facility server 200 includes a communication unit 201, a controller 202, a storage 203, and an input/output unit 204.

The communication unit 201 is an interface used to perform communication with the management server 100 and the mobile terminal over a network.

The controller 202 is a unit configured to control the facility server 200. The controller 202 is a CPU, for example. The controller 202 has a function of receiving an electronic key corresponding to a vehicle 10 from the management server 100, and distributing the electronic key to the mobile terminal 300 that is being managed. Furthermore, the controller 202 has a function of causing the mobile terminal 300 that is being managed to erase the electronic key, in a case where data requesting invalidation of the electronic key is received from the management server 100.

The storage 203 is a unit configured to store information, and is a storage medium such as a RAM, a magnetic disk or a flash memory. The storage 203 stores various programs to be executed by the controller 202, data to be used by the programs, and the like.

The input/output unit 204 is a unit configured to receive an input operation performed by a manager of the facility, and present information. The input/output unit 204 includes a touch panel and controller thereof, and a liquid crystal display and controller thereof, for example. The input/output unit 204 may also include a keyboard, a pointing device, audio input/output unit and the like.

The mobile terminal 300 is a terminal that is carried by a worker of a facility, and is a small computer such as a smartphone, a mobile phone, a tablet terminal, a personal digital assistant or a wearable computer (such as a smartwatch), for example. The mobile terminal 300 has a function of acquiring an electronic key through the facility server 200, and a function of transmitting the acquired electronic key to the on-board device 400 by near-field wireless communication.

The mobile terminal 300 includes a communication unit 301, a controller 302, a storage 303, an input/output unit 304, and a near-field communication unit 305.

The communication unit 301 is an interface used to perform communication with the facility server 200 over a network.

The controller 302 is a unit configured to control the mobile terminal 300. The controller 302 is a CPU, for example. The controller 302 performs a process of acquiring an electronic key from the facility server 200 and temporarily storing the electronic key, and a process of transmitting the electronic key to the on-board device 400 through the near-field communication unit 305, described later, to be authenticated. Furthermore, the controller 302 performs a process of erasing the electronic key that is stored, based on an instruction received from the facility server 200.

The storage 303 is a unit configured to store information, and is a storage medium such as a RAN, a magnetic disk or a flash memory. The storage 303 stores various programs to be executed by the controller 302, data to be used by the programs, an electronic key that is received, and the like.

The input/output unit 304 is a unit configured to receive an input operation performed by a worker of a facility, and present information. The input/output unit 304 includes a touch panel and controller thereof, and a liquid crystal display and controller thereof, for example.

The near-field communication unit 305 is a module that performs communication with the on-board device 400 mounted on the vehicle 10. The near-field communication unit 305 performs communication over a short distance (that allows communication to be performed between inside and outside of a vehicle) by a predetermined wireless communication standard.

In the present embodiment, the near-field communication unit 305 performs data communication according to Bluetooth (registered trademark) standard. Additionally, in the present embodiment, BLE is cited as an example, but other wireless communication standards may also be used. For example, Near Field Communication (NFC), Ultra Wideband (UWB) or WiFi (registered trademark) may also be used.

Figure 6:
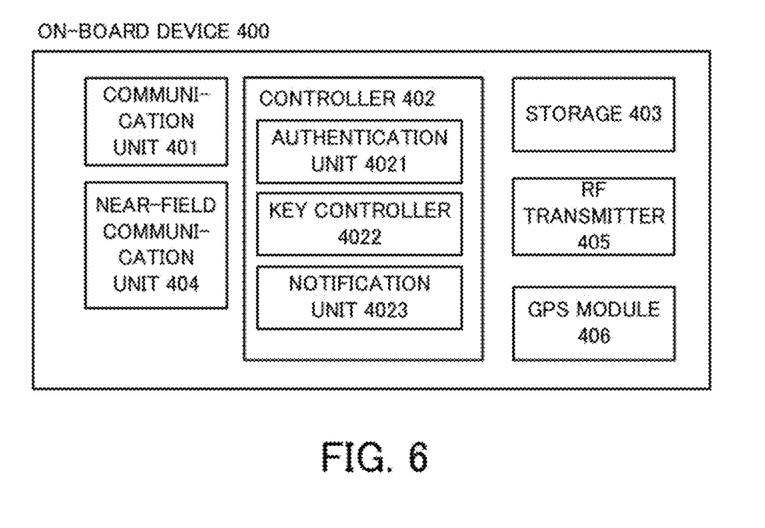
FIG. 6 is a block diagram schematically illustrating an example of an on-board device.

Next, a description will be given of the on-board device 400. FIG. 6 is a block diagram schematically illustrating an example configuration of the on-board device 400.

In relation to the vehicle 10 according to the present embodiment, locking/unlocking of a door and starting of an engine may be controlled based on signals that are transmitted through radio waves in a high-frequency (radio frequency from 100 MHz to 1 GHz, for example; hereinafter referred to as "RF") band (hereinafter, such a signal will be referred to as "key signal").

The key signal is a signal for identifying a mobile unit (a smart key) that is carried by a user, and is normally transmitted from the smart key. For example, in a case where there is a smart key within a predetermined area having the vehicle 10 at a center, the vehicle 10 performs communication with the smart key and acquires a key signal, and in a case where the key signal is confirmed, locking/unlocking of the door, starting of the engine, turning on of power and the like are enabled.

The on-board device 400 is a device that is disposed inside the vehicle 10, and has a function of authenticating a mobile terminal 300 by performing near-field wireless communication with the mobile terminal 300, and a function of transmitting a key signal to the vehicle 10 by using radio waves in the RF band based on a result of authentication of the mobile terminal 300. The key signal is a same signal as the signal that is transmitted from the smart key.

In the present embodiment, instead of the smart key, the on-board device 400 issues the key signal to the vehicle 10 after authenticating the mobile terminal 300. This enables the vehicle 10 to be locked/unlocked and the engine to be started without using a physical key or the smart key.

The on-board device 400 includes a communication unit 401, a controller 402, a storage 403, a near-field communication unit 404, an RF transmitter 405, and a GPS module 406.

The communication unit 401 is an interface used to perform communication with the management server 100 over a network.

The controller 402 performs a process of performing near-field wireless communication with the mobile terminal 300 through the near-field communication unit 404 described later and authenticating the mobile terminal 300, and a process of transmitting a key signal based on an authentication result. For example, the controller 402 is a microcomputer.

As functional modules, the controller 402 includes an authentication unit 4021, a key controller 4022, and a notification unit 4023. Each functional module may be implemented by the CPU executing a program stored in storage (such as a ROM).

The authentication unit 4021 performs authentication of a mobile terminal 300 based on the electronic key transmitted from the mobile terminal 300. Specifically, authentication information that is stored in advance and the electronic key received by near-field wireless communication are compared with each other, and authentication success is determined in the case where the information pieces match. In the case where the two pieces of authentication information do not match, authentication failure is determined. Additionally, the method of authentication used by the authentication unit 4021 may be a method of simply comparing pieces of authentication information with each other and verifying identity, or a method that uses asymmetric cryptography.

In the case where the mobile terminal 300 is successfully authenticated, the key controller 4022 transmits the key signal to the vehicle 10 through the RF transmitter 405. The key signal may alternatively be transmitted in response to a confirmation signal transmitted from the vehicle 10.

The notification unit 4023 acquires data (vehicle data) about the subject vehicle, and transmits the same to the management server 100 over a network. In the present embodiment, the notification unit 4023 acquires position information through the GPS module 406 described later, and generates vehicle data including the position information. Furthermore, in a case where various operations using the electronic key are performed in relation to the vehicle 10, vehicle data for notifying of the same is generated.

The storage 403 is a unit configured to store information, and is a storage medium such as a RAM, a magnetic disk or a flash memory. The storage 403 stores various programs to be executed by the controller 402, data to be used by the programs, authentication information to be checked against the electronic key, and the like.

The near-field communication unit 404 is a module that performs communication with the mobile terminal 300. The near-field communication unit 404 performs communication over a short distance (that allows communication to be performed between inside and outside of the vehicle) by a predetermined wireless communication standard.

The RF transmitter 405 is a module that transmits the key signal to the vehicle 10 by radio waves in the RF band.

The GPS module 406 is a module that outputs position information of the subject device based on signals received from GPS satellites orbiting the Earth.

Figure 7A:
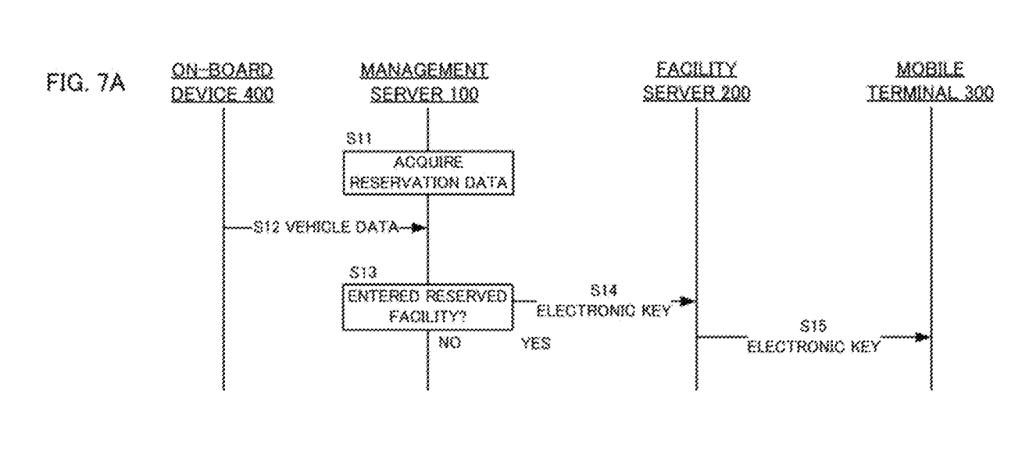
FIGS. 7A and 7B are diagrams of flows of data that is transmitted/received in first and third phases.

Next, processes performed by the structural elements described above will be described. First, a description will be given of a phase (a first phase) in which the management server 100 determines arrival of the vehicle 10 at a predetermined facility, and distributes the electronic key of the vehicle 10 to the mobile terminal 300 carried by a worker of the facility. FIG. 7A is a diagram of a flow of data in the first phase.

First, in step S11, the management server 100 (the reservation information management unit 1021) acquires the reservation data. Acquisition of the reservation data may be periodically performed during operation of the system. The acquired reservation data is stored in the storage 103.

Furthermore, during traveling of the vehicle 10, the on-board device 400 (the notification unit 4023) periodically transmits the vehicle data (the position information) to the management server 100 (step S12). The vehicle data includes the position information and the identifier of the vehicle 10. The vehicle data is acquired by the management server 100 (the vehicle management unit 1022), and is stored in the storage 103. Additionally, the order of execution of steps S11 and S12 is not limited to the one described above.

In step S13, the management server 100 (the key management unit 1023) checks the vehicle data and the reservation data against each other, and determines whether there is a vehicle 10 that entered the facility for which the reservation was made. In the present step, positive determination is made in a case where the following conditions are satisfied.

(1) The identifier of a vehicle 10 that is managed by the system is included in the reservation data.
(2) The position information of the vehicle 10 indicates a position on the premises of the facility for which the reservation was made.
(3) A current time matches scheduled entry date/time indicated by the reservation data.

The above-described (1) and (3) may be determined based on the reservation data. Furthermore, the above-described (2) may be determined based on the vehicle data and the facility location data.

In the case of positive determination in step S13, it is indicated that the user arrived in a vehicle the facility for which the reservation was made. In this case, the management server 100 (the key management unit 1023) generates an electronic key corresponding to the vehicle 10, and transmits the same to the facility server 200 corresponding to the facility (step 314).

The facility server 200 receiving the electronic key distributes the electronic key to at least one mobile terminal 300 under its management (step 315). A worker of the facility is thereby enabled to unlock the vehicle 10 using the mobile terminal 300.

Additionally, at the time of transmission of the electronic key in step S14, the user (such as the owner of the vehicle) may be inquired as to whether the electronic key may be transmitted or not. Such an inquiry may be issued through a mobile terminal carried by the user (hereinafter "user terminal"), or may be issued through a terminal that is mounted on the vehicle (such as the on-board device 400). Furthermore, a notification indicating that the electronic key is transmitted to the facility device may be issued to the user.

Figure 8:
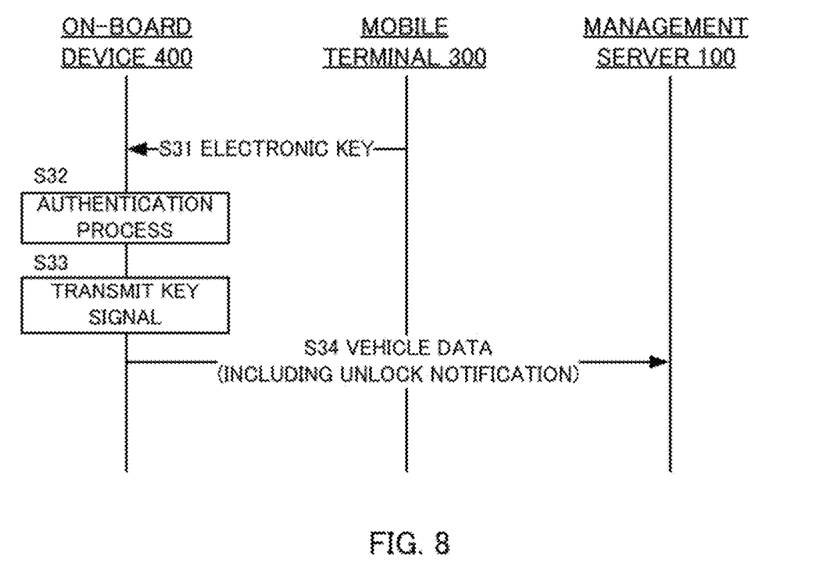
FIG. 8 is a diagram of a flow of data that is transmitted/received in a second phase.

Next, a process of unlocking the vehicle 10 using the mobile terminal 300 (a second phase) will be described. FIG. 8 is a diagram of a flow of data in the second phase.

When a worker of a facility performs an operation of unlocking the vehicle 10 with the mobile terminal 300 (the input/output unit 304), the mobile terminal 300 transmits the electronic key to the on-board device 400 in step S31. Then, in step 832, the authentication unit 4021 of the on-board device 400 performs an authentication process by comparing the electronic key transmitted from the mobile terminal 300 with the authentication information that is stored in advance.

When authentication succeeds, the key controller 4022 transmits the key signal to the vehicle 10 by the RF transmitter 405 (step 833). Unlocking of the vehicle 10 and starting of the engine are thereby enabled. Additionally, the present step may alternatively be performed in response to a predetermined operation performed on the vehicle 10. For example, the key signal may be transmitted in response to pressing of a door lock button or a master switch.

Next, the on-board device 400 (the notification unit 4023) transmits, to the management server 100, vehicle data including a notification indicating that the vehicle is unlocked (step S34). The vehicle data includes, in addition to the position information and the identifier of the vehicle 10, data indicating that the vehicle is unlocked and the identifier of the mobile terminal 300 that transmitted the electronic key. The management server 100 updates the vehicle data (key use state) based on the aforementioned vehicle data. The management server 100 may thus grasp that the electronic key is being used by a specific mobile terminal 300.

Furthermore, when the engine is stopped, the power is turned off or the door is locked, for example, vehicle data including a notification to the effect is transmitted. The management server 100 may thus grasp that use of the electronic key is ended.

Figure 7B:
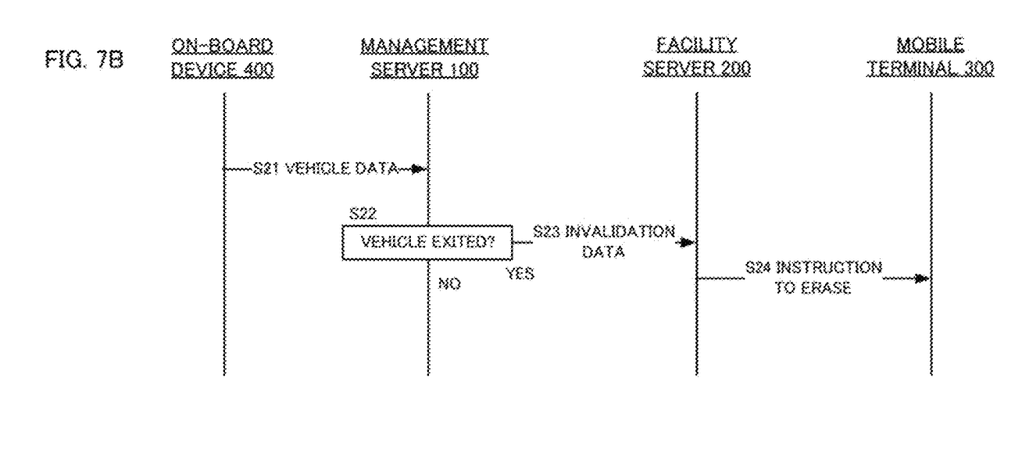

Next, a phase (a third phase) in which the management server 100 determines exit of the vehicle 10 from a predetermined facility, and instructs the mobile terminal 300 to erase the electronic key will be described.

FIG. 7B is a diagram of a flow of data in the third phase.

The on-board device 400 (the notification unit 4023) periodically transmits vehicle data to the management server 100 (step S21). The vehicle data is acquired by the management server 100 (the vehicle management unit 1022), and is stored or is used for update.

In step S22, the management server 100 (the key management unit 1023) determines whether the vehicle 10 for which the electronic key is valid exited the facility. This determination may be performed based on the position information that is transmitted and the facility location data.

Here, in the case where exit of the vehicle 10 from the facility is determined, the management server 100 (the key management unit 1023) generates data (invalidation data) requesting erasure of the electronic key for the vehicle 10, and transmits the data to the facility server 200 (step 323).

The facility server 200 receiving the invalidation data transmits an instruction to erase the electronic key to at least one mobile terminal 300 under its management (step 324). The mobile terminal 300 receiving the instruction erases the electronic key corresponding to the vehicle 10, among the electronic keys that are stored.

Additionally, in the present embodiment, an electronic key is erased to invalidate the electronic key, but a process of invalidating an electronic key is not limited to such an example.

As described above, with the vehicle system according to the first embodiment, an electronic key that is valid only on the premises (such as a parking lot) of a hotel, a commercial facility or the like may be transmitted to the facility side. That is, a valet may be allowed to move a vehicle without the key being handed over to the valet.

Additionally, in the present embodiment, erasure of the electronic key is determined by the management server 100 but such determination may alternatively be performed by the facility server 200. For example, the facility server 200 may periodically acquire position information of the mobile terminal. 300, and may instruct the mobile terminal 300 to erase the electronic key, in a case where exit of the mobile terminal 300 from the premises of the facility is determined. Furthermore, the electronic key may be erased based on an operation performed by the manager of the facility.

Second Embodiment

In the first embodiment, the management server 100 controls transmission of the electronic key based on whether the vehicle 10 is located within an area corresponding to a facility.

A second embodiment is an embodiment in which entry/exit to/from a facility is determined by further using position information of an entrance and an exit of the facility.

Figure 9:
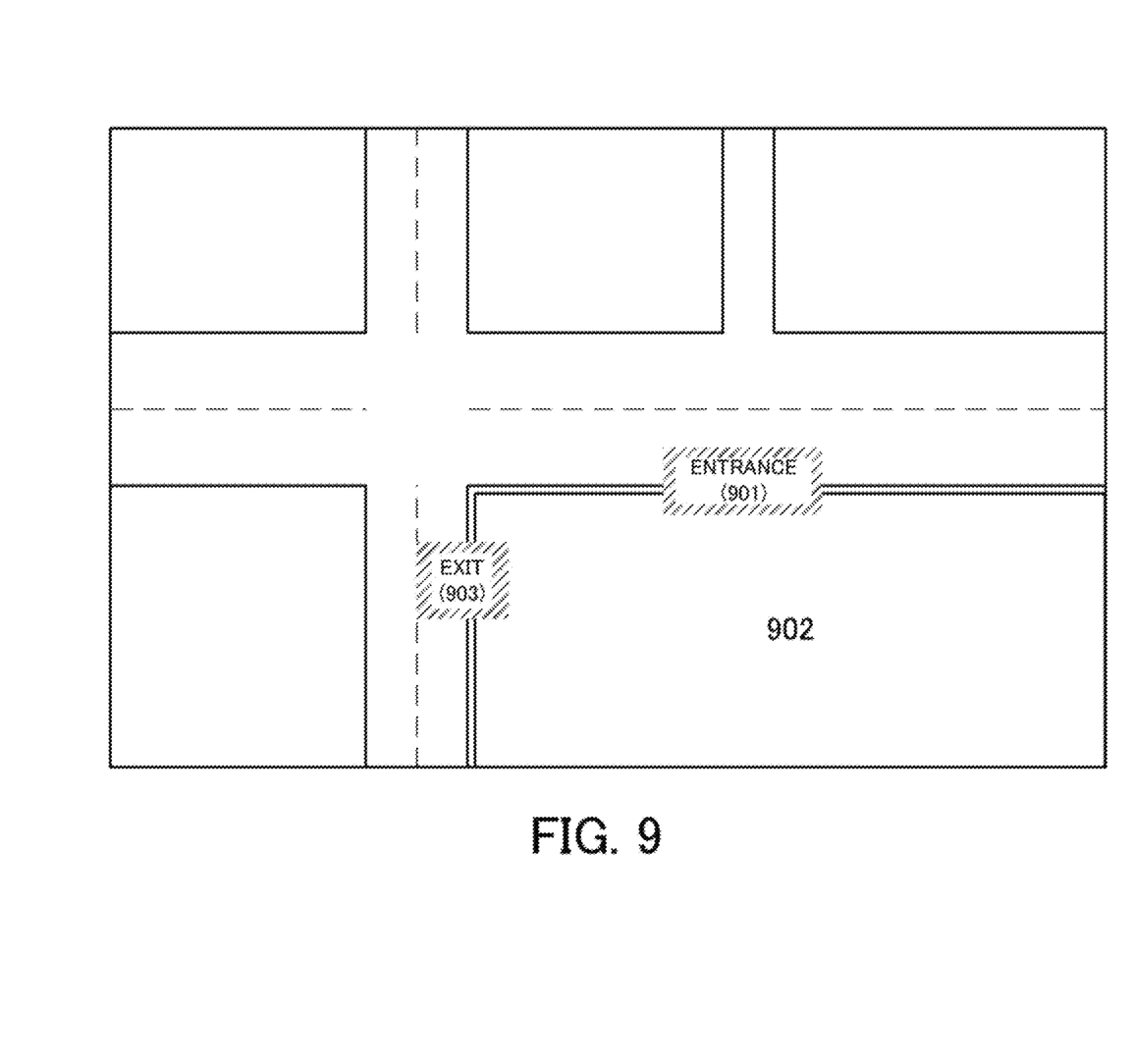
FIG. 9 is diagram for describing position information of vehicle entrance/exit.

In the second embodiment, the facility location data that is stored in the storage 103 includes data indicating geographical positions of the entrance and the exit of the facility. FIG. 9 is an example illustrating positions of an entrance and an exit for a vehicle. Here, entry of a vehicle 10 into a facility may be determined in a case where the vehicle 10 passes through an area 901 corresponding to the entrance and enters an area 902 corresponding to the facility. Furthermore, exit of the vehicle 10 from the facility may be determined in a case where the vehicle 10 passes through an area 903 corresponding to the exit and moves out of the area 902.

In this manner, entry/exit of the vehicle 10 to/from a facility may be more accurately determined by further using the position information of the entrance and the exit of the facility.

Third Embodiment

A third embodiment is an embodiment in which, when the vehicle 10 that is unlocked with an electronic key moves out of the premises of a facility, such a situation is detected and notified to the user.

In the third embodiment, in a case where there is a vehicle 10 that satisfies the following conditions, the key management unit 1023 of the management server 100 determines occurrence of an abnormality and transmits a notification to a predetermined device (hereinafter "user device") that is associated with the user.

(1) An electronic key is used on a vehicle 10.
(2) Position information corresponding to the vehicle 10 indicates a position outside the area corresponding to the facility.

Whether the electronic key is being used may be determined by referring to the key use state included in the vehicle data. Furthermore, the position of the vehicle may be determined by referring to the vehicle data that is periodically transmitted from the on-board device 400.

In the case where there is a vehicle 10 that satisfies the conditions mentioned above, the management server 100 notifies the user device of an abnormality.

Additionally, in the case where there is a vehicle 10 that satisfies the conditions mentioned above, the management server 100 may generate a request for limiting traveling of the vehicle, and transmit the same to the corresponding on-board device 400. The maximum speed, output and the like of the vehicle 10 may thereby be limited, for example.

Fourth Embodiment

A fourth embodiment is an embodiment in which, in a case where abnormal sensor data is transmitted from a vehicle 10 that is unlocked with an electronic key, such a situation is detected and not to the user.

In the fourth embodiment, the on-board device 400 further includes a sensor that detects abnormalities. The sensor is typically, but not limited to, an accelerometer that detects contact and impact.

In the present embodiment, the notification unit 4023 includes, in the vehicle data, acquired sensor data in addition to the position information, and periodically transmits the vehicle data to the management server 100.

Furthermore, in the case where there is a vehicle 10 that satisfies the following conditions, the key management unit 1023 of the management server 100 determines occurrence of an abnormality, and transmits a notification to the user device.

(1) It is within a period when an electronic key is being used on a vehicle 10.
(2) Sensor data transmitted from the on-board device 400 indicates a value exceeding a threshold.

For example, in the case where acceleration data output by the accelerometer exceeds a threshold, it can be estimated that the vehicle 10 is in contact with an obstacle or the like. In this case, the management server 100 notifies the user device of an abnormality.

Additionally, in the present embodiment, the sensor data is compared with a threshold, but the sensor data may alternatively be transferred to the user device as it is. For example, in the case where the sensor is an image sensor, an acquired image may be transferred to the user device. The user may thus be enabled to grasp the state of the vehicle in real time.

Modification

The embodiments described above are merely examples, and the present disclosure may be changed as appropriate within the scope of the disclosure.

For example, processes and units described in the present disclosure may be freely combined and implemented to the extent that no technical conflict arises.

For example, in the description of the embodiments, the facility server 200 is used, but the management server 100 may directly transmit the electronic key to the mobile terminal 300 without using the facility server 200.

Furthermore, in the description of the embodiments, the on-board device 400 transmits the position information to the management server 100, but the position information of the vehicle 10 may be acquired by other methods. For example, in the case where the vehicle 10 and a user terminal carried by an occupant of the vehicle are linked, the position information of the vehicle 10 may be acquired from the user terminal.

Furthermore, a process that is described to be performed by one device may be shared and performed by a plurality of devices. Processes described to be performed by different devices may be performed by one device. Which function is to be implemented by which hardware component (server component) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMs, EEPROMs, magnetic cards, flash memories, optical cards, and any type of medium suitable for storing electronic instructions.

What is claimed is:

1. An information processing device comprising:
a storage configured to store first position information regarding geographical positions of (i) a first area that corresponds to a physical entrance and a physical exit of a predetermined facility, wherein the first area separates the predetermined facility from a road, and (i) a second area that corresponds to the predetermined facility, wherein the predetermined facility is accessed through the physical entrance; and
a controller configured to:
detect that a predetermined vehicle has passed through the physical entrance or the physical exit of the predetermined facility based on the first position information,
transmit an electronic key for enabling control of the vehicle, to a facility device corresponding to the facility, based upon the vehicle entering the second area after passing through the physical entrance of the first area, and
invalidate the electronic key that was transmitted to the facility device based upon the vehicle exiting the second area and passing through the physical exit of the first area.

2. The information processing device according to claim 1, wherein
the facility device is a mobile terminal carried by a worker of the facility or a device that manages the mobile terminal, and the electronic key is configured to unlock and lock the vehicle using the mobile terminal, and enable control of the ignition of the vehicle.

3. The information processing device according to claim 1, further comprising
a storage configured to store reservation information for the facility in association with the vehicle, wherein
the controller transmits the electronic key to the facility device in a case where a reservation is made for the facility in association with the vehicle and the vehicle enters the second area.

4. The information processing device according to claim 1, wherein
the controller periodically acquires second position information that is position information of the vehicle, and determines entry/exit of the vehicle based on the second position information.

5. The information processing device according to claim 4, wherein
the controller determines entry/exit of the vehicle by checking the first position information and the second position information against each other.

6. The information processing device according to claim 4, wherein
the controller monitors the second position information in a period when the electronic key is being used, and issues a notification to a user device associated with the vehicle in a case where exit of the vehicle to outside the second area is determined.

7. The information processing device according to claim 1, wherein
the controller acquires sensor information from the vehicle in a period when the electronic key is being used, and issues a notification to a user device associated with the vehicle in a case where the sensor information indicates an abnormal value.

8. A vehicle system including a first server device that manages a plurality of vehicles, and a second server device that is associated with a predetermined facility, wherein
the first server device includes:
a storage configured to store first position information regarding geographical positions of (i) a first area that corresponds to a physical entrance and a physical exit of a predetermined facility, wherein the first area separates the predetermined facility from a road, and (i) a second area that corresponds to the predetermined facility, wherein the predetermined facility is accessed through the physical entrance; and
a first controller configured to:
detect that a predetermined vehicle has passed through the physical entrance or the physical exit of the predetermined facility based on the first position information,
transmit an electronic key for enabling control of the vehicle, to the second server device, based upon the vehicle entering the second area after passing through the physical entrance of the first area, and
invalidate the electronic key that was transmitted to the second server device based upon the vehicle exiting the second area corresponding to the predetermined facility and passing through the physical exit of the first area.

9. The vehicle system according to claim 8, wherein the second server device distributes the electronic key to at least one mobile terminal carried by a worker of the facility, and the electronic key is configured to unlock and lock the vehicle using the mobile terminal, and enable control of the ignition of the vehicle.

10. The vehicle system according to claim 9, wherein in a case where the vehicle exits the second area, the first server device transmits, to the second server device, invalidation data requesting invalidation of the electronic key.

11. The vehicle system according to claim 10, wherein in a case where the invalidation data is received, the second server device distributes, to the at least one mobile terminal, an instruction to erase the electronic key.

12. The vehicle system according to claim 9, further comprising the mobile terminal.

13. The vehicle system according to claim 12, wherein the mobile terminal locks/unlocks the vehicle by transmitting the electronic key to the vehicle by near-field wireless communication.

14. The vehicle system according to claim 8, wherein the first server device further includes a storage configured to store reservation information for the facility in association with the vehicle, and the first controller transmits the electronic key to the second server device in a case where a reservation is made for the facility in association with the vehicle and the vehicle enters the second area.

15. The vehicle system according to claim 8, wherein the first controller monitors position information of the vehicle in a period when the electronic key is being used, and issues a notification to a user device associated with the vehicle in a case where exit of the vehicle to outside the second area is determined.

16. The vehicle system according to claim 8, wherein the first controller acquires sensor information from the vehicle in a period when the electronic key is being used, and issues a notification to a user device associated with the vehicle in a case where the sensor information indicates an abnormal value.

17. A vehicle system including a server device that manages a plurality of vehicles, and on-board devices that are mounted on the vehicles, wherein
the server device includes:
a storage configured to store first position information regarding geographical positions of (i) a first area that corresponds to a physical entrance and a physical exit of a predetermined facility, wherein the first area separates the predetermined facility from a road, and (i) a second area that corresponds to the predetermined facility, wherein the predetermined facility is accessed through the physical entrance; and
a first controller configured to:
detect that a predetermined vehicle, of the vehicles, has passed through the physical entrance or the physical exit of the predetermined facility based on the first position information,
transmit an electronic key for enabling control of the vehicle, to a facility device associated with the predetermined facility, based upon the predetermined vehicle entering the second area after passing through the physical entrance of the first area, and
invalidate the electronic key that was transmitted to the facility device based upon the predetermined vehicle exiting the second area and passing through the physical exit of the first area, and
the on-board device includes a second controller configured to acquire the electronic key transmitted to the facility device, and permit movement of the vehicle based on the electronic key.

18. The vehicle system according to claim 17, wherein the facility device is a mobile terminal carried by a worker of the facility or a device that manages the mobile terminal.

19. The vehicle system according to claim 18, wherein the electronic key transmitted to the mobile terminal communicates with the on-board device by near-field wireless communication.

20. The vehicle system according to claim 17, wherein in a case where the vehicle exits the second area, the server device transmits, to the facility device, invalidation data requesting invalidation of the electronic key.

* * * * *